May 5, 1970 D. R. BARBER 3,510,793
AMPLIFIER REGULATOR EMPLOYING AN ELECTROLYTIC VARIABLE RESISTANCE DEVICE
Filed Feb. 19, 1965
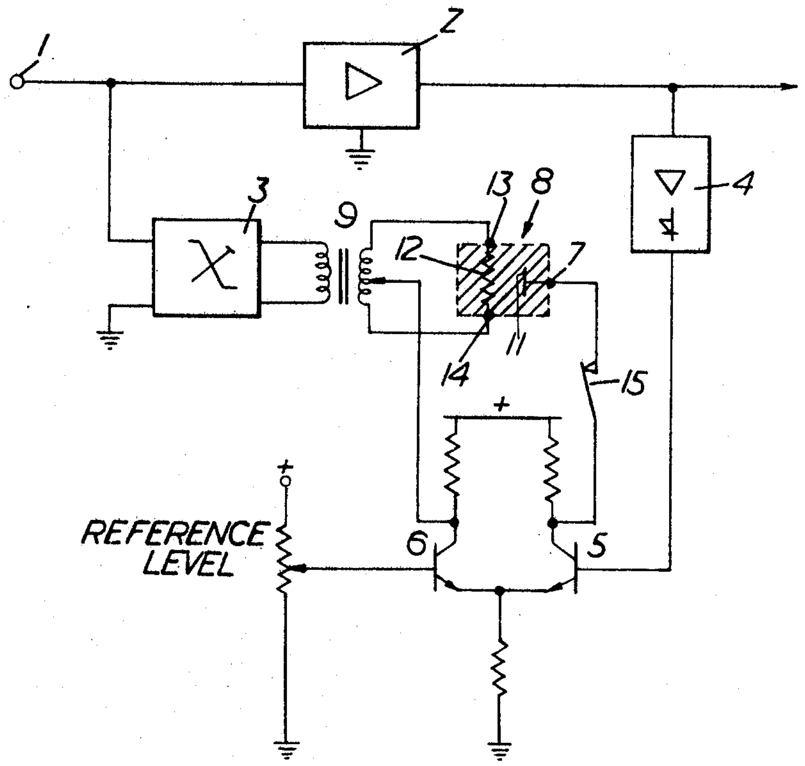

United States Patent Office 3,510,793
Patented May 5, 1970

3,510,793

AMPLIFIER REGULATOR EMPLOYING AN ELECTROLYTIC VARIABLE RESISTANCE DEVICE

Donald Robert Barber, Bishop's Stortford, Herts, England, assignor to International Standard Electric Corporation, New York, N.Y., a corporation of Delaware Filed Feb. 19, 1965, Ser. No. 433,998
Claims priority, application Great Britain, Feb. 26, 1964, 7,967/64
Int. Cl. H03f 3/66, 1/00
U.S. Cl. 330—52 7 Claims

ABSTRACT OF THE DISCLOSURE

The gain of a repeater amplifier is controlled by an electrolytic variable resistance inserted into a feedback loop between a pilot signal level detector and a variable equalizing network. The electrolytic resistance used is a "memistor" which provides a variation of resistance with pilot signal level and provides the advantage of memory regulation, i.e. the repeater gain remains at its last setting if the pilot signal fails for any period.

This invention relates to amplifier regulation.

According to the invention there is provided amplifier regulation equipment in which the gain of the amplifier is controlled by an electrolytic variable resistance device.

Equipment embodying the invention will now be described with reference to the accompanying drawing, which shows a schematic circuit diagram of terminal or repeater equipment of an electrical communication system. The communication system is a carrier telephony system in which a pilot signal is transmitted for the purpose of indicating the characteristics of the transmission path between a transmitter and a receiver.

In systems of this type it is desirable that should the pilot signal fail for any period, the repeater amplifier should remain at its last setting until the pilot signal returns to normal. This process is called memory regulation.

Referring to the drawing, the modulated carrier signals and the pilot signal are applied via input terminal 1 to a repeater amplifier 2 which controls their level to the desired value in accordance with an increase or decrease in the loss of a variable equaliser network 3 connected across the input terminals of the amplifier. 2. The pilot signal, after it has been amplified by the amplifier 2, is separated, amplified and detected in known manner by a pilot amplifier 4. The output from the pilot amplifier 4 is applied to the base of a n-p-n transistor 5 forming part of a pilot level discriminator circuit which responds to any departure of the pilot signal level from normal.

The base of a further n-p-n transistor 6 is connected to a reference level of potential corresponding to the normal level of the pilot signal, so that while the received pilot signal level is normal, there is no difference in potential between the collectors of the transistors 5 and 6, equal current flowing through the collector emitter paths of both transistors 5 and 6. The collectors of the transistors 5 and 6 are connected respectively to a terminal 7 of an electrolytic variable resistance device 8 and to the centre tap on the secondary winding of a transformer 9.

The device 8 comprises an electrolytic plating bath 10 for example of copper sulphate solution in which are immersed a metallic anode 11, for example of copper connected to the terminal 7, and a resistive substrate 12, for example of carbon connected between two terminals 13 and 14, the terminals 13 and 14 being connected to the ends of the secondary winding of the transformer 9.

The connection between the collector of transistor 5 and the terminal 7 may include an "out of range" switch

15 which is opened under control of the pilot amplifier 4.

According to the direction of plating current flowing through the electrolyte between the anode 11 and the resistive substrate 12, a conducting metal layer is either deposited upon or removed from the substrate 12 whose resistance varies accordingly.

The loss insertion by the variable equaliser network 3, the normal resistance value of the device 8, and the value of the reference level of transistor 6 are so arranged that with the received pilot signal level at normal, the gain of the amplifier 2 is at the required value.

Any departure of the plot signal from this level causes a corresponding plating or deplating current to flow through the device 8 which varies the resistance of the device 8 and hence the impedance reflected via the transformer 9 to the network 3. Consequently the insertion loss of the variable equaliser network 3 is altered in accordance with the changed attenuation indicated by the change in level of the pilot signal. Hence the impedance across the amplifier's input is altered, which serves to correct the gain of the amplifier 2.

Since the resistance of the device 8 is only altered as a result of the flow of plating current, and otherwise remains constant, the process of memory regulation mentioned earlier is achieved because, if the pilot signal should fail the device stays at its last resistance value and the gain of the repeater amplifier remains at its last setting.

It is to be understood that the foregoing description of specific examples of this invention is not to be considered as a limitation of its scope.

What I claim is:

1. Amplifier regulation equipment for controlling the gain of an amplifier comprising, an amplifier having input and output terminals, an electrolytic variable resistance device controlled by a pilot signal and capable of exhibiting a memory of its most recent setting in case of failure of the controlling pilot signal, and means coupling said device in a feedback loop between the output and input terminals of said amplifier to provide regulation for the amplifier.

2. Equipment is claimed in claim 1, in which said device is formed by an electrolytic plating bath in which are immersed a metallic anode and a resistive element, said metallic anode being connected to one terminal of the device and the resistive element being connected between two further terminals of the device.

3. Equipment as claimed in claim 2, comprising a variable equaliser for said amplifier connected between said two further terminals, and a pilot signal level discriminating circuit connected between said one terminal and said two further terminals.

4. Equipment as claimed in claim 3, in which said variable equaliser is connected to said two further terminals via a transformer, and in which said discriminating circuit is connected to said two further terminals via a centre tapping on the secondary winding of said transformer.

5. Equipment as claimed in claim 2, in which said plating bath is a solution of copper sulphate with said anode of copper and said resistive element of carbon.

6. Equipment as claimed in claim 2 in which the resistance across the resistive element depends upon the amount of material plated on the resistive element from the electrolytic bath, and the amount of material plated on the resistor provides a durable memory of the condition last measured by the device pending a change in the condition.

7. Repeater equipment for a communication system comprising an amplifier to which communication signals and a pilot signal received over an incoming line are applied, said amplifier passing said signals to an output, a pilot signal separation circuit connected to said output and arranged to separate said pilot signal from the amplifier's output, a source of reference level signal indicative of the value which the pilot signal should have, a comparator to which said separated pilot signal is applied for comparison with the reference level signal and from control elements of which separate output signals are devised, an electrolytic variable resistance device formed by a resistive element and an anode immersed in an electrolyte bath, means connecting said resistive element between two terminals and means connecting said anode to another terminal, a transformer having the two ends of a center-tapped secondary winding connected to the terminals of said resistive element and its primary winding connected through an qualizing network to the input of said amplifier, and means connecting to the center-tap of said center-tapped winding of the transformer and to the terminal of said anode from control elements of the comparator, whereby changes in the pilot signal level cause outputs from said comparator across the resistor and the anode to vary the resistance of said resistive element by producing a plating or deplating action thereon, said variation in resistance in turn varying the effect of said resistive element on said equalizing network and changing the effect which the latter exerts on the gain of said amplifier, and said plating constituting a memory of the most recent pilot signal to control the amplifier in case of failure of the pilot signal.

References Cited

UNITED STATES PATENTS

| | | | |
|---|---|---|---|
| 2,154,888 | 4/1939 | Black | 330—52 X |
| 2,752,571 | 6/1956 | Terroni | 333—16 |
| 3,178,698 | 4/1965 | Graham | 330—52 X |
| 3,303,429 | 2/1967 | Zellmer | 330—52 |

NATHAN KAUFMAN, Primary Examiner

U.S. Cl. X.R.

330—51, 86, 199; 333—16